A. V. Ryder.
Horse Rake.

Nº 61023. Patented Jan. 8, 1867.

Witnesses
G. Breed
M. Breed

Inventor
Andrew V. Ryder
by Daniel Breed
Atty

United States Patent Office.

ANDREW V. RYDER, OF GERMANO, OHIO.

Letters Patent No. 61,023, dated January 8, 1867.

---

IMPROVEMENT IN HORSE RAKES.

---

The Schedule referred to in these Letters Patent and making part of the same.

---

TO ALL WHOM IT MAY CONCERN:

Be it known that I, ANDREW V. RYDER, of Germano, in the county of Harrison, and State of Ohio, have invented a new and useful Improvement in Horse Rakes; and I do hereby declare that the following is a full and exact description thereof, reference being had to the accompanying drawings, and to the letters of reference marked thereon.

My invention consists mainly in a peculiar arrangement of levers for working the rake by treadle action in discharging the hay, and in holding down the teeth while the rake is filling, and also in the use of peculiar springs for pressing down the separate teeth, and in other improvements.

My improvements relate to horse rakes in common use, the general construction of which may correspond to the accompanying drawings, in which—

Figure 1:
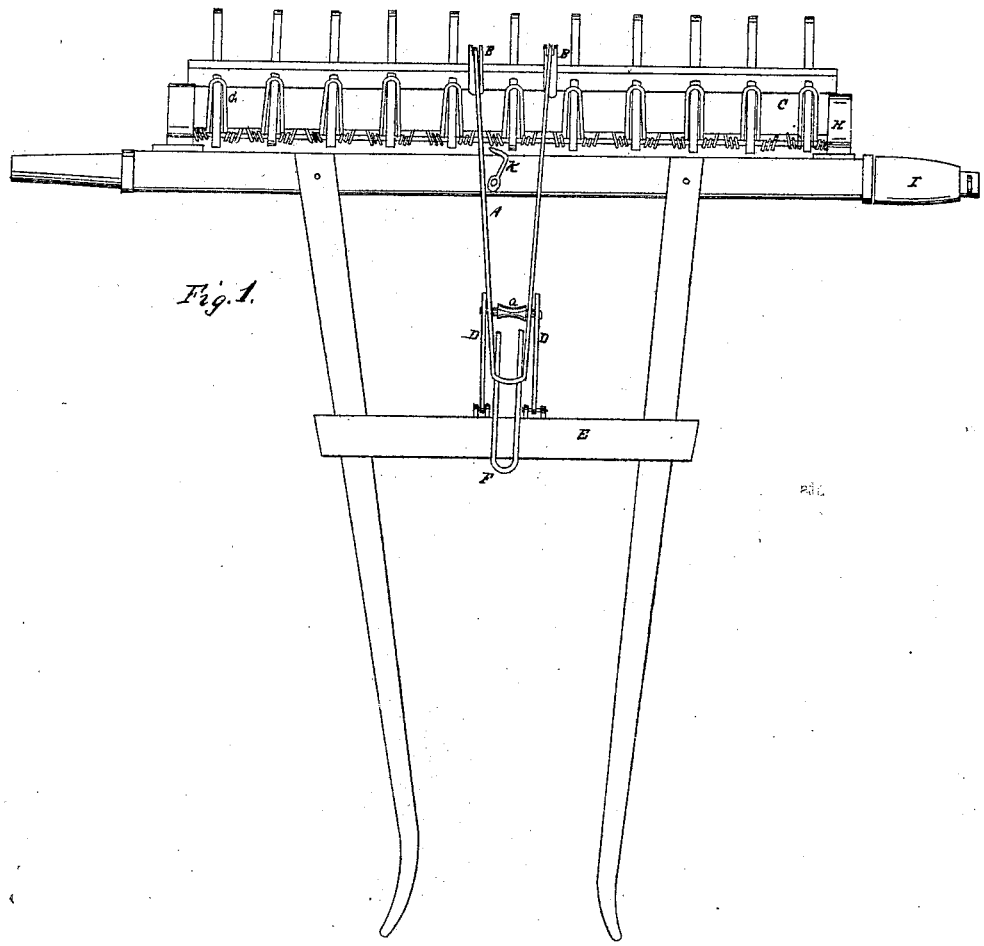
Figure 1 is a top view.
Figure 2:
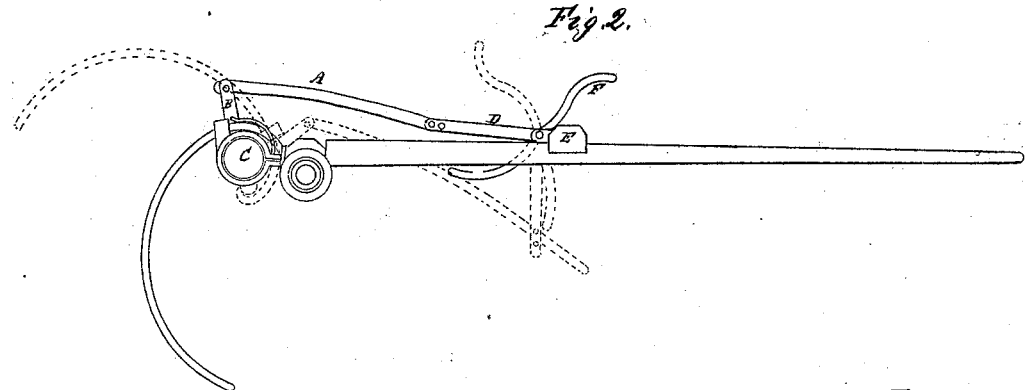
Figure 2 is a side view, the wheels being removed to show the skein on the axle.

A peculiar lever, A, which is bow-shaped at its forward end, has the two branches of its rear end hinged to two arms, B, fixed in the rake-head C. This lever is also hinged to two links, D, which in turn are hinged to the front cross-bar, E, of the machine. This lever carries a foot-piece or treadle, a. Another lever, F, has its fulcrum suppported on the same cross-bar, and, working under the bow end of lever A, serves to lock the latter and hold the teeth down, as seen in black lines, fig. 2, the driver's foot resting on the upper end of the lever F. When the driver wishes to elevate the rake teeth, as seen in red lines, fig. 2, he puts his foot on the foot-piece or treadle a, and thus raises the teeth. When he removes his foot the teeth fall by their own weight and then the levers are again locked, as above mentioned. Each tooth of the rake has a separate wire spring, G, to press each tooth down independently, in order to rake through low or rough places. The rake-head is secured to the axle by peculiar bearings, H, which are fastened to the axle by a bolt forming part of the bearing itself, and passing through the axle. These bearings are made broad in order to prevent them from wearing the wooden head. They are also placed at the ends of the rake-head, so that they may not interfere with the small springs G, and the motion of the small rod L, employed in holding these springs and the teeth. The spindle of the axle is covered by a thimble, I, in order to prevent the wear of the wooden axle. When the rake teeth are elevated for passing from field to field they may be held up by means of a small hook, K, which catches one of the arms, B, when the latter is brought home upon the axle.

I do not broadly claim the use of two levers worked by treadle action, but confine my invention to the peculiar arrangement above described.

Having thus fully described my invention, what I claim, and desire to secure by Letters Patent of the United States, is—

The above-described construction and arrangement of the levers A and F, in combination with the links D, for operating the rake by treadle action, substantially as set forth.

ANDREW V. RYDER.

Witnesses:
ALEX. B. ROBERTS,
THOMAS MOORE.